(12) United States Patent
Peng et al.

(10) Patent No.: US 6,563,701 B1
(45) Date of Patent: May 13, 2003

(54) STRUCTURE FOR HARD DISK DRAWING BOX

(75) Inventors: Cheng-Tzu Peng, Chupei (TW); Chuan-Yi Yeh, Hsinchu (TW)

(73) Assignee: Promise Technology Inc., Hsinchu (TW)

( * ) Notice: Subject to any disclaimer, the term of this patent is extended or adjusted under 35 U.S.C. 154(b) by 23 days.

(21) Appl. No.: 09/952,636

(22) Filed: Sep. 17, 2001

(51) Int. Cl.⁷ .................................................. G06F 1/16
(52) U.S. Cl. ........................ 361/685; 361/683; 361/686
(58) Field of Search .................................. 361/683–686; 439/11–13, 591, 595, 596, 606, 638, 660, 709, 712–718, 728, 729

(56) References Cited

U.S. PATENT DOCUMENTS

| | | | | |
|---|---|---|---|---|
| 4,941,841 A | * | 7/1990 | Darden et al. | 439/377 |
| 5,442,513 A | * | 8/1995 | Lo | 361/685 |
| 5,563,767 A | * | 10/1996 | Chen | 361/685 |
| 5,694,290 A | * | 12/1997 | Chang | 361/685 |
| 6,231,145 B1 | * | 5/2001 | Liu | 312/332.1 |

* cited by examiner

Primary Examiner—Darren Schuberg
Assistant Examiner—Yean H Chang
(74) Attorney, Agent, or Firm—Rabin & Berdo, P.C.

(57) ABSTRACT

The present invention provides an improved structure connector for hard disk dawning box by designing the connector of the said box for rotational purpose hereof, by means of rotating the connecting seat of the connector outwardly for correspondingly coupling with the hard disk. Since this connection of the hard disk and the connector, no more transfer wires (cables) or the like will be using for communicating and the connector will accompany with the hard disk stored in an allowance space of the box by rotating the connecting of the connector inwardly to the box.

3 Claims, 8 Drawing Sheets

STRUCTURE FOR HARD DISK DRAWING BOX

TECHNICAL FIELD

This invention is an improved structure of a connector for a hard disk drawing box. The connector is configured as an integrally rotational form for direct connection to the hard disk. Hence, no more transfer wires (cables) or the like will be used for signal transferring.

BACKGROUND OF THE PRESENT INVENTION

Recently, the hard disk drawing boxes on sale in the market use transfer wires (cables) for data transferring. Under this process, the inner impedance and media in the wires (cables) will reduce signal-transferring quality and enlarge this product's space including the volume of the inner box and the lengths of the outer frame.

SUMMARY OF THE INVENTION

An object of the present invention is to directly connect the hard disk and the connector to eliminate the transfer wires cables or the like. Hence, the signal transfers onto the hard disk will not be affected by the impedance and media in the communication wires (cables) which may lessen the signal quality.

Another object is that the transfer wires (cables) are been eliminated; therefore, the volume of the drawing box will be minimized thus saving more space for other usages.

These and other objects, features and advantages of the present invention will become apparent from the following:

BRIEF DESCRIPTION OF DRAWINGS

FIG. 5: combination diagram of the torsion spring and rotating support frame of

DETAILED DESCRIPTION OF THE PRESENT INVENTION

Figure 1:
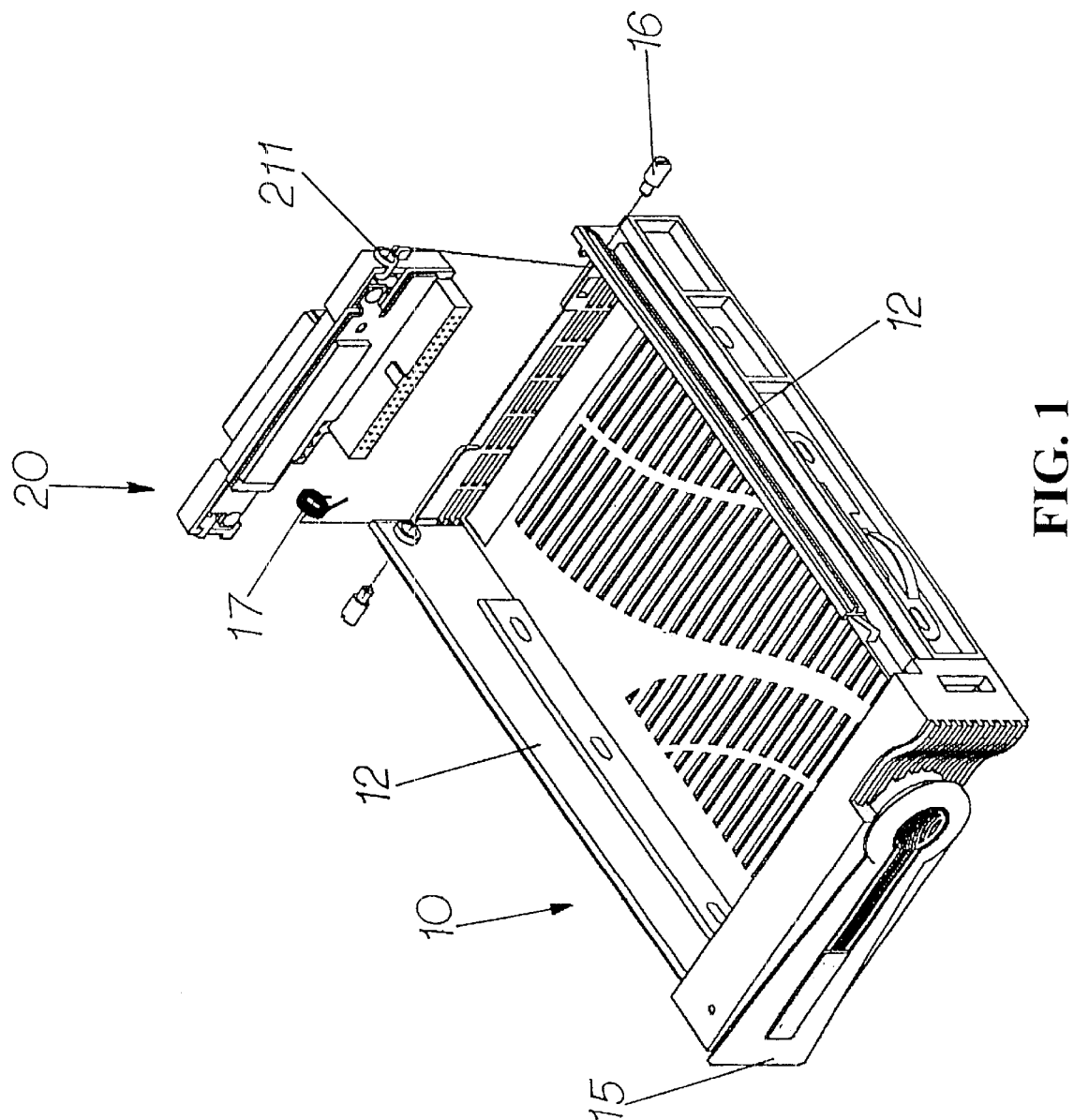
FIG. 1: exploded diagram of the present invention

Please refer to FIG. 1, which shows the main structure of present invention including a drawing box (10) and a connector (20).

Figure 2:
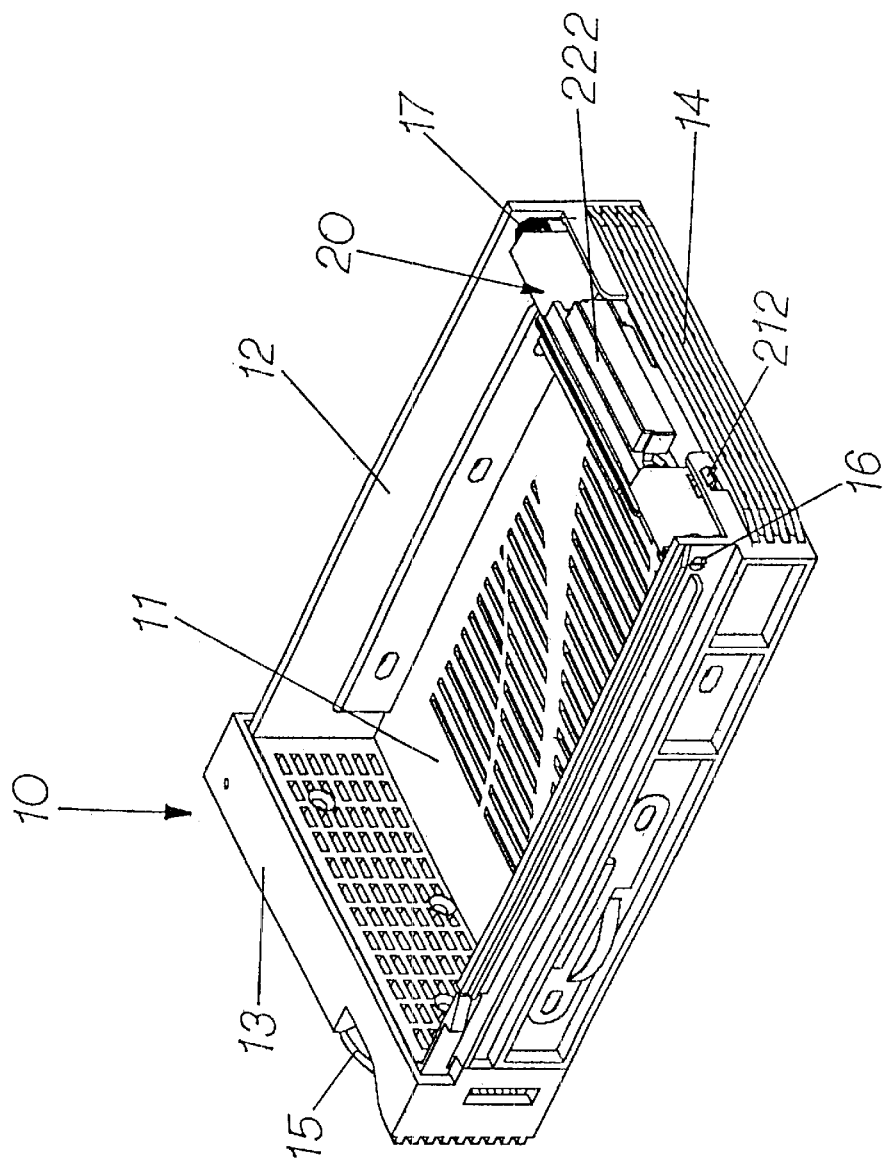
FIG. 2: combination diagram of the present invention

Please refer to FIGS. 1 and 2. The drawing box (10) is molded as a whole (unitary) member with a rectangular shape. The box (10) has a hollow, internal space (11) for installing hard disk(s). A front plate (13) of the box (10) has a handle (15) for taking the box (10) in or out. The bottom-middle-left of stopping plate (14) of the box (10) has an open, small-square slot (141) for fixing an interlocking hook (212). Two lateral plates (12) of the box (10) have respective opened pivotal holes for supporting the connector (20) during rotation.

Figure 3:
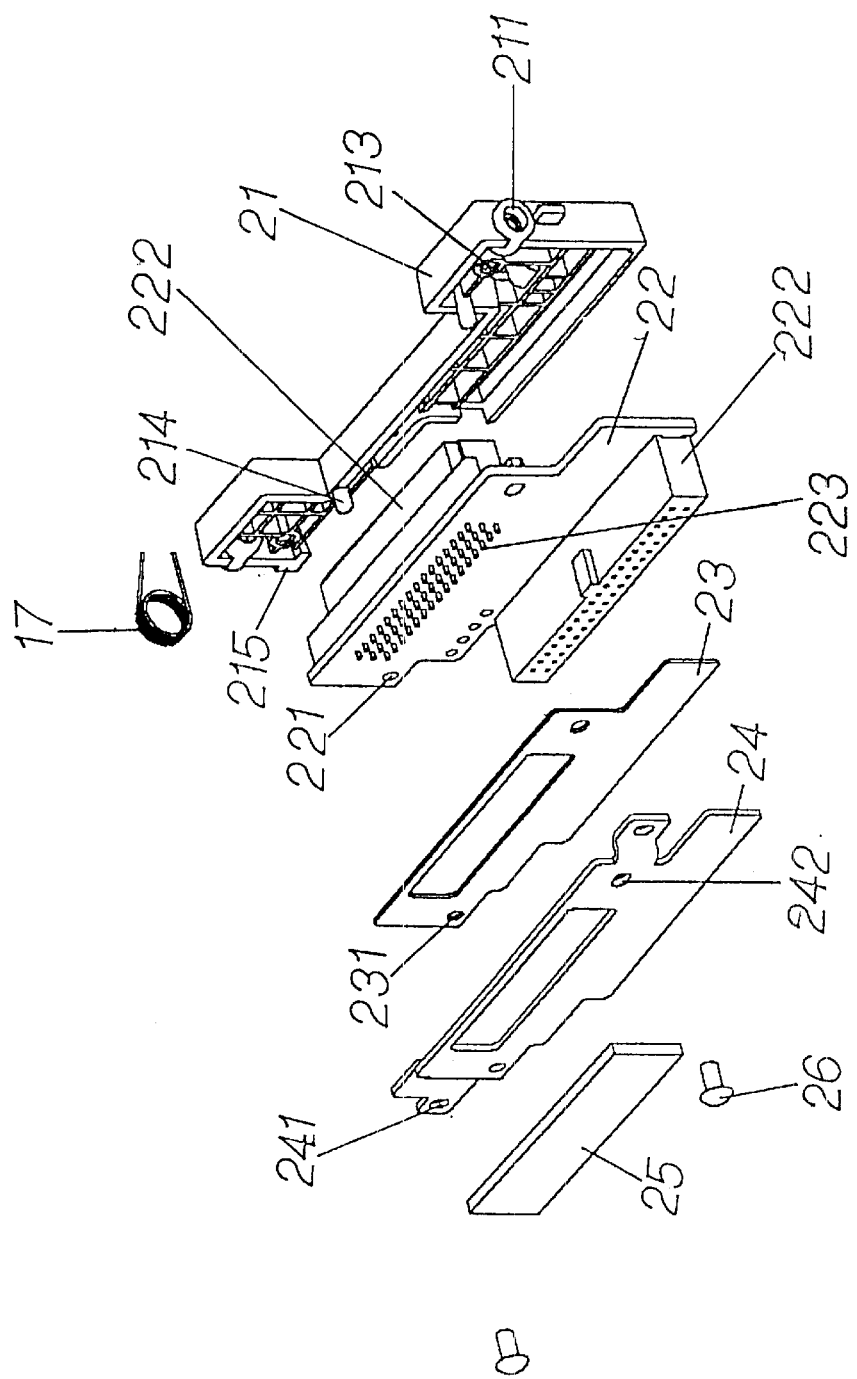
FIG. 3: exploded diagram of the connector of the present invention
Figure 4:
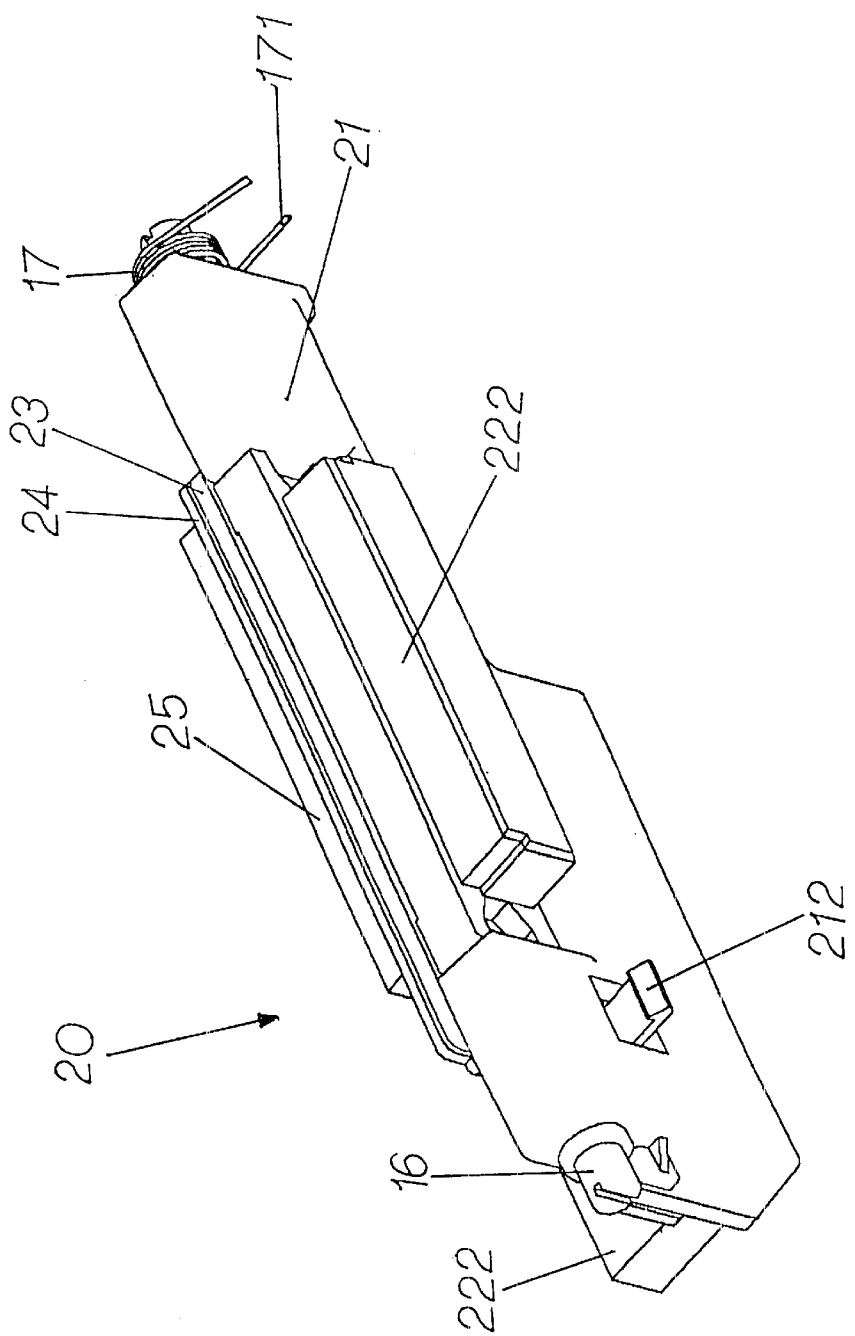
FIG. 4: perspective diagram of the connector of the present invention

Please refer to FIG. 3 and FIG. 4. The connector (20) is constructed of a rotating support frame (21), PCB components (22), insulating plate (23), metallic fixture plate (24) and a shield of pins cover (25).

Please refer to FIG. 3. The rotating support frame (21) is a long shaped structure whereon, on its front is set an interlock hook (212), on its rear is set a pair screw holes (213) and a fixture slot (214), on its right and left side is a respective set of pivotal holes (211). Beneath every pivotal hole (211) is respectively set a stopping panel (215). The front and back of PCB (22) is respective disposed a connecting seat (222). Both of the seats (222) are set parallel and staggeringly up and down. Two slot holes (221) are disposed on the PCB (22). Corresponding to the two holes (221), a passing hole (231) and screw hole (241) are disposed on the insulating plate (23) and metallic fixture plate (24) receptively. A shield (25) is provided for protecting the pins (223).

Please refer to diagrams FIG. 3 and FIG. 4. The PCB (22) will be overlaid on and contacted with the rotating support frame (21), so that the slot holes (221) couple the fixture slots (214). Accordingly, dealing with the passing holes (231) and fixture slots (214), the insulating plate (23) will be come to and overlaid-contacted on the PCB (22). Similarly, dealing with the passing holes (242) and fixture slots (214), the metallic fixture plate (24) will be come to and overlaid-contacted on insulating plate (23). Therefore, the rotating support frame (21), PCB (22), insulating plate (23) and metallic fixture plate (24) will be contacted-joined together, and the corresponding screw holes (241) (213) will be aligned. Since respective taking the screws (26) passing through the screw hole (241), across the insulating plate (23) and PCB (22) to reach screw holes (213), then by means of screwing the screws (26) to securely fasten the metallic fixture plate (24), insulating plate (23), PCB (22) and rotating support frame (21) together. Finally, corresponding covering the shield of pins (25) on the pins (223) of PCB (22).

Figure 5:
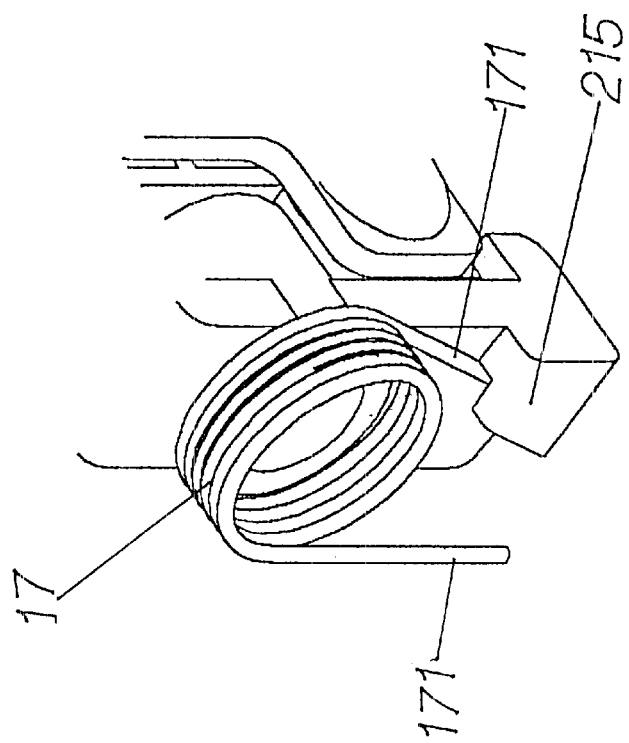

Please refer FIGS. 1 and 5. Fabricating the connector (20) transversely against and into to the lateral plates (12) and fixing them. One pivotal hole (211) of connector (20) is set a torsion spring (17), whereon one spring arm (171) of the spring (17) is locked up on the stopping panel (215) of rotating support frame (21) and the other spring arms (171) is locked up and to force the stopping plate (14). Then matching the two pivotal holes (211) of connector (20) with their corresponding pivotal holes (121) of lateral plate (120), by means of inserting the two pivots (16) into the two holes (121) respectively and fixing the pivots (16), therefore the connector (20) will ready for rotating.

Figure 6:
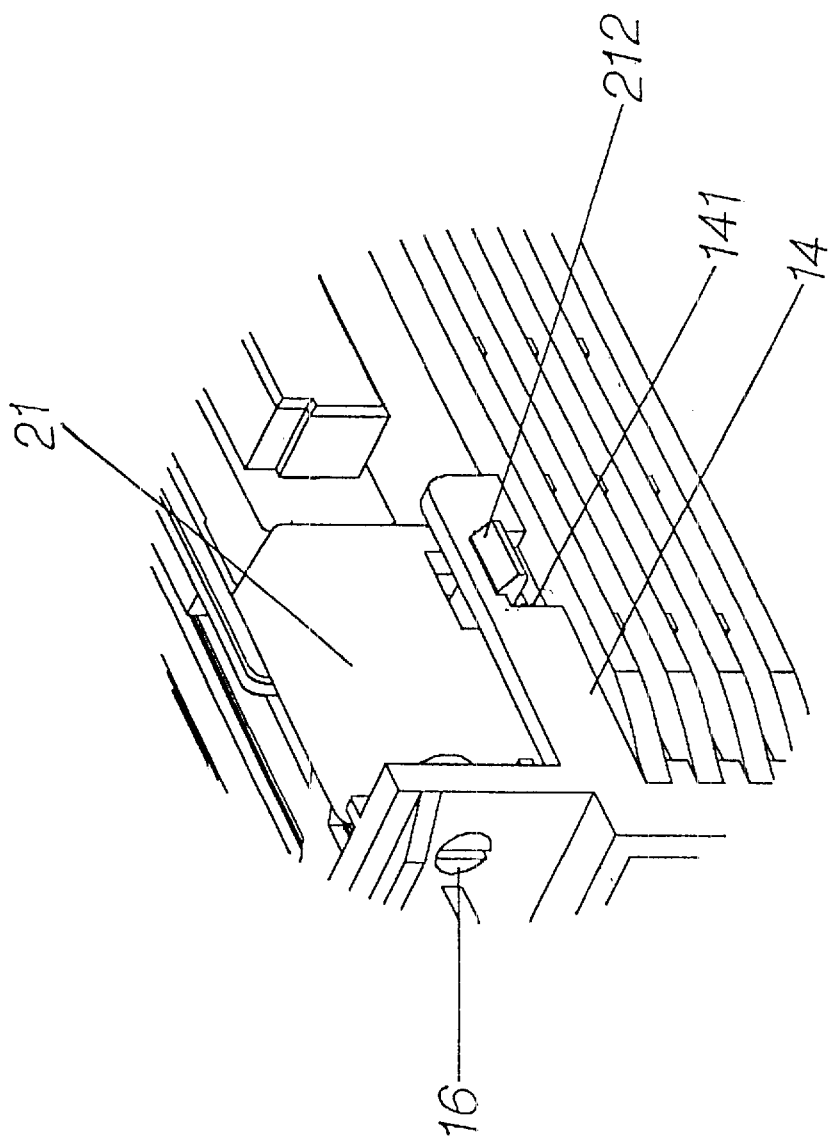
FIG. 6: enlarged perspective diagram of the interlocking hook and its vicinity
Figure 7:
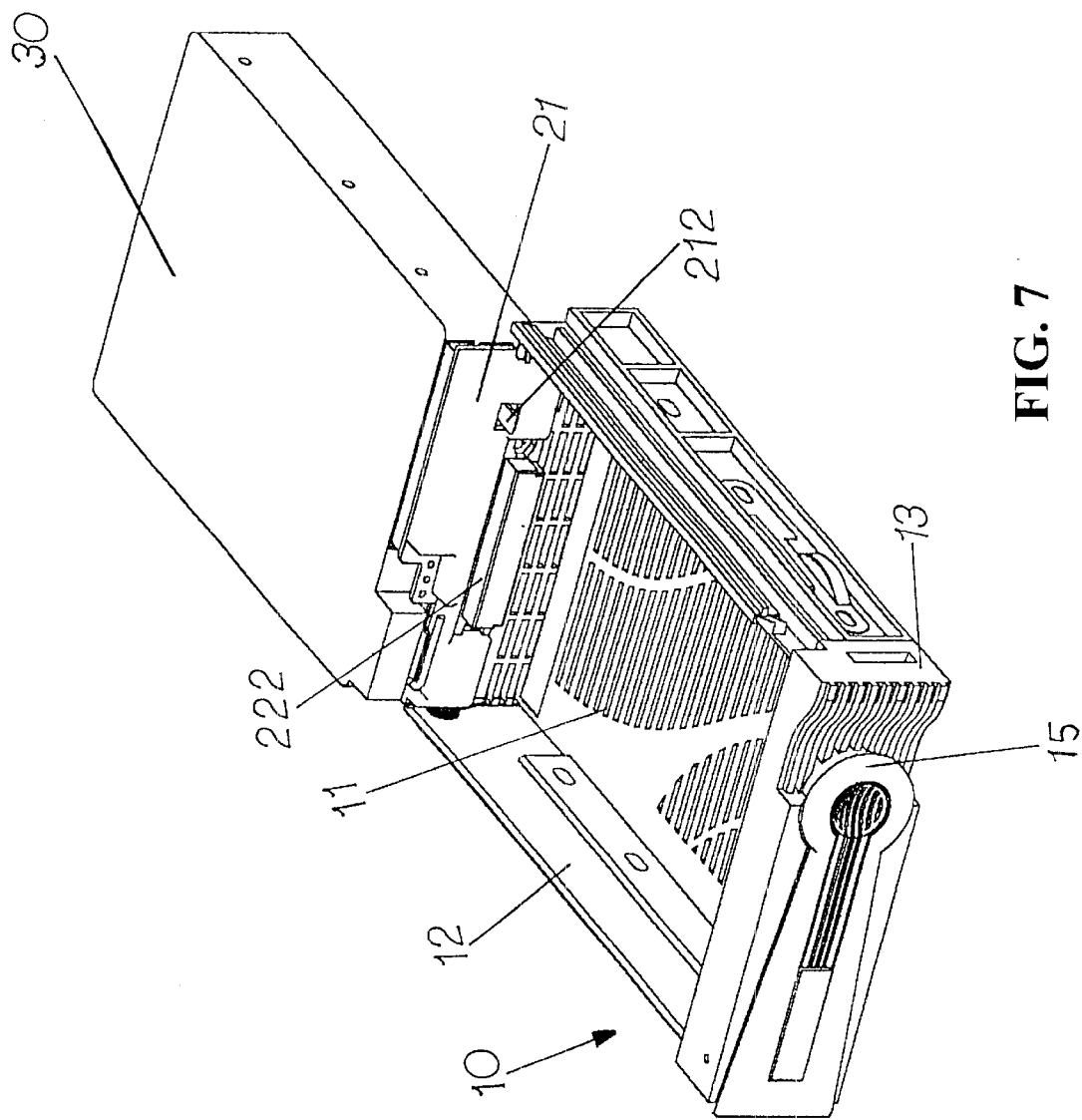
FIG. 7: combination of the present invention and the hard disk
Figure 8:
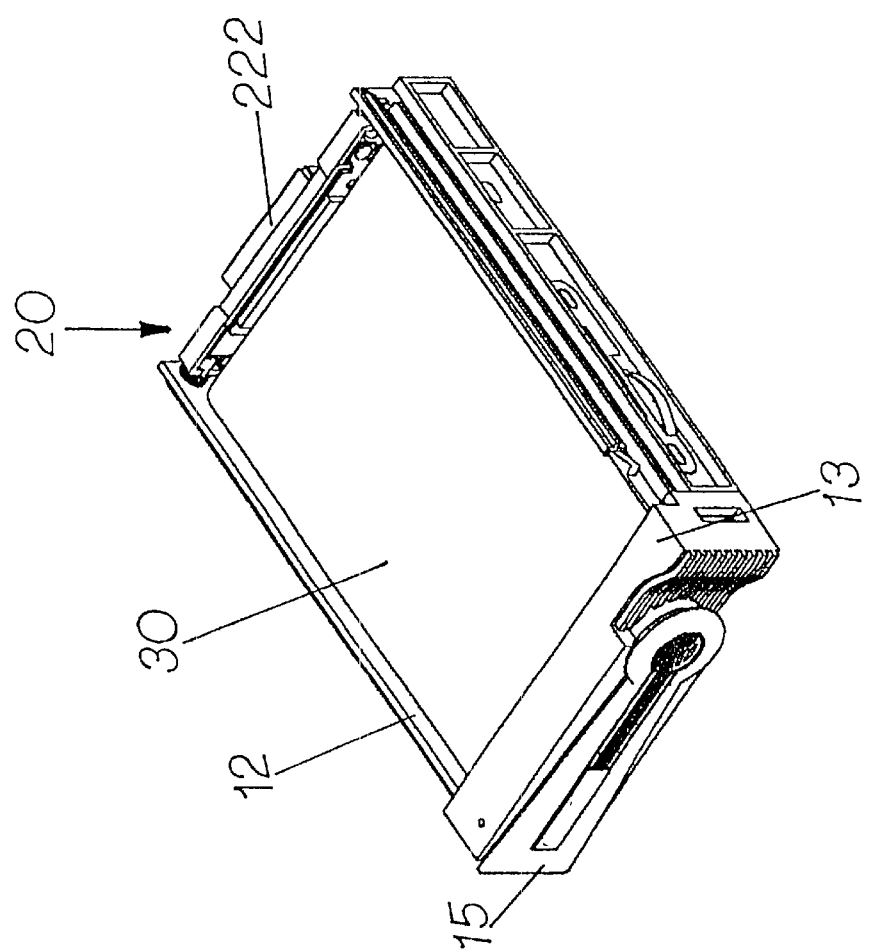
FIG. 8: finished combination diagram of the hard disk and the connector of the present inventor.

Please refer to FIGS. 5 and 6. Pressing a force on the interlocking hook (212) of connector (20) bottomwardly, the spring arm (171) will be moved forward and against the stopping panel (215), whereby the connector will be driven in a rotating state. Then correspondingly matching the hard disk (30) with the connecting seat (222) of connector (20) and connecting the hard disk on. Then, by means of a closing-book-like action to draw the connected connector (20) and hard disk (30) hereto the allowance space (11), hence the hard disk (30) will lay flatly on the space (11). As soon as aforeaction completed, the interlocking hooks (212) will be locked at the interlocking slot (141) to prevent a movable action that the hard disk (212) will be accompanied with the connector (20) while the drawing box (10) being/is drawn/drawing.

The present invention has really the practical applicability and the creativeness, and base never been published to the public, that confirms to the regulations specified in the Patent Law.

The embodiment mentioned above is only a preferred embodiment of the present invention, and cannot restrict the range of embodiment of the present invention to it. Any modification or change made based on the present invention shall be within coverage of the present invention as defined in the claims.

What is claimed is:

1. A hard disk drawing box assembly, comprising:

a unitary box structure having a rectangular shape, and having a hollow allowance space therein; and a rotatable connector including a rotating support frame, a PCB having a set of components, an insulating plate, a metallic fixture plate, and a pin shield;

said PCB being overlaid on a rear of said rotating support frame, said insulating plate being overlaid on said PCB, said metallic fixture plate being overlaid on said insulating plate, and said pin shield being overlaid on said metallic fixture plate, said connector being fastened to and disposed at a rear-lateral side of said box structure for rotating movement.

2. The hard disk drawing box assembly recited in claim 1, wherein said rotating support frame has an interlocking hook disposed thereon, and said box structure has a slot at a rear thereof for receiving said hook so as to secure said connector to said box structure.

3. The hard disk drawing box assembly recited in claim 1, wherein said support frame has a pivotal hole, and said connector further includes a torsion spring disposed at the pivotal hole, said torsion spring having two arms for forcing-pushing said connector.

* * * * *